United States Patent [19]

Harrell

[11] Patent Number: 4,493,413
[45] Date of Patent: Jan. 15, 1985

[54] BUCKET CONVEYOR ASSEMBLY

[76] Inventor: John C. Harrell, 721 Riverview Dr., Suffolk, Va. 23434

[21] Appl. No.: 342,434

[22] Filed: Jan. 25, 1982

[51] Int. Cl.³ .................................................. B65G 17/36
[52] U.S. Cl. .................................... 198/708; 198/706
[58] Field of Search .............. 198/703, 706, 708, 802, 198/735

[56] References Cited

U.S. PATENT DOCUMENTS

| 618,343 | 1/1899 | Haiss | |
|---|---|---|---|
| 658,657 | 9/1900 | Le Grand | |
| 2,426,304 | 8/1947 | Hapman | 198/706 |
| 2,476,039 | 7/1949 | Hapman | 198/52 |
| 3,795,305 | 3/1974 | Sandvik | 198/145 |
| 4,051,948 | 10/1977 | Sackett, Sr. | 98/735 X |
| 4,221,764 | 9/1980 | Saxon | 422/268 |

OTHER PUBLICATIONS

Simplex Meyer Conveying Elevators, Bulletin 910H, May 1975, Meyer Machine Company, San Antonio, TX.
Universal Combination Elevator Conveyor-EL-CON, Universal Industries, Waterloo, IA, Bulletin EC-77-C.
Facts Dura-Buket the "SS" Super Strength Plastic Elevator Bucket, Dura-Buket Division-National Oats Company, Inc., Collinsville, IL.

Primary Examiner—Robert J. Spar
Assistant Examiner—Dennis J. Williamson
Attorney, Agent, or Firm—Griffin, Branigan, & Butler

[57] ABSTRACT

A bucket conveyor assembly includes both a bucket endless conveyor and a cover endless conveyor, with the cover endless conveyor being located inside a horizontal section of the bucket endless conveyor. The cover endless conveyor is driven so that covers (40) mounted on its lower flight are superimposed with gaps (44) between buckets (24) mounted on the bucket conveyor at a loading zone (26). Material to be loaded into the buckets is gravity-fed between the top and bottom flights (36A and B) of both the bucket endless conveyor and the cover endless conveyor and dropped into bottom-flight buckets (24) through the bottom-flight covers (40). The covers have an unsymmetrical inverted V-shape, with the leading side (46) of the V being on a steeper angle than the trailing side (48) of the V. A bucket tipping bar (58) tilts each of the buckets forwardly while materials are still moving from the covers (40) into the buckets (24) and then a ramp (60) controls the rate at which the buckets return to their normal attitudes. One embodiment (FIG. 2) includes a double feed into the buckets from opposite sides of the conveyors. An angled bucket turning slab (66) impinges on upside-down buckets to upright the buckets, but maintains contact with the buckets during the turn to control the rate of turn.

7 Claims, 4 Drawing Figures

BUCKET CONVEYOR ASSEMBLY

BACKGROUND OF THE INVENTION

This invention relates broadly to the art of bucket conveyors, and more particularly to continuous loading systems for bucket conveyors.

It is generally recognized that bucket conveyors are more difficult to load than many other types of endless conveyors in that bucket conveyors normally have spaces between the buckets through which material falls if an attempt is made to continuously load the buckets. Notwithstanding this disadvantage, bucket conveyors are often used where granular, and/or fluid, material must be conveyed upwardly. Although it is possible to stop each bucket at a loading station, such a loading procedure slows the conveyor an unacceptable amount for many applications.

Attempts have been made to continuously load bucket conveyors by putting the buckets extremely close to each other and allowing lips of the buckets to overlap when the buckets are traveling in a horizontal manner, such as is disclosed in U.S. Pat. No. 3,795,305 to Sandvik. This system has been relatively successful, however, it has the disadvantage that the buckets thereof cannot rotate 360° without contacting adjacent buckets and rotation of the buckets must, therefore, be strictly controlled. Such bucket-attitude-control equipment, including special cammed buckets, is unduly expensive and, therefore, drives up costs. Further, the buckets in such a bucket conveyor sometimes rotate in improper manners due to malfunctions and cause adjacent buckets to become "jammed" together. Malfunctions such as these can "pop" the buckets from conveying chains and these loose buckets can further "jam up" other buckets, popping them from the chains. If appropriate action is not taken, all the buckets can be "stripped" from the chains. It is, therefore, an object of this invention to provide a bucket conveyor in which the buckets and bucket-attitude-control equipment is relatively inexpensive and uncomplicated. It is a further object of this invention to provide a bucket conveyor whose buckets cannot come into contact with adjacent buckets when they rotate through 360°.

It has been suggested that buckets of a bucket conveyor can be continuously loaded by employing an additional endless conveyor having covers attached thereto for covering spaces between buckets at loading zones. In this regard, the cover endless conveyors are mounted above a horizontal portion of a bucket endless conveyor so that covers of a bottom flight of the cover endless conveyor correspond with spaces between buckets of a top flight of the bucket endless conveyor. Such systems are disclosed in U.S. Pat. No. 4,221,764 to Saxon, U.S. Pat. No. 658,657 to LeGrand, and U.S. Pat. No. 618,343 to Haiss. U.S. Pat. No. 2,476,039 to Hapman discloses a similar system although in this patent the cover is not attached to an endless conveyor but rather to a reciprocating member which is reciprocated over a bucket space at a loading zone. A difficulty with such prior-art systems is that they have tended to take up too much room by having a cover endless assembly above a bucket endless assembly. In addition, they have tended to be too complicated by requiring unusual structures for feeding material between top and bottom flights of cover conveyors to be loaded into the buckets. Concerning complexity of feeding mechanisms, the Saxon patent calls for either feeding through both upper and lower flights of a cover endless conveyor (Saxon FIG. 1) or utilizing a screw conveyor (Saxon FIG. 7) to convey material between conveyor flights. The LeGrand and Hapman patents require hoppers to be positioned between conveyor flights, immediately above buckets to be loaded, which may be inconvenient or impossible in many situations because of space requirements. The Haiss patent appears to call for a mechanism for "throwing" material into a drum (see page 2, lines 97-104 of Haiss). It is, therefore, an object of this invention to provide a continuous-feed assembly for a bucket endless conveyor which does not take up an unduly large amount of space and is not unduly complex.

In addition, it is an object of this invention to provide such a bucket endless conveyor feed mechanism which is effective in operation, spilling virtually none of the fed material onto a floor.

It is a further object of this invention to provide such a continuous-feed bucket conveyor which is relatively uncomplicated and economical to manufacture.

SUMMARY

According to principles of this invention, a loading assembly for a bucket conveyor comprises a cover endless conveyor positioned inside a horizontal section of a bucket endless conveyor, with the covers covering gaps, or spaces, between the bucket conveyors at a loading zone. A loading assembly comprises a conduit immediately adjacent to the loading zone which allows material to be gravity-fed toward the buckets, with nozzles thereof being directed laterally so that kinetic energy of the material developed during the gravity feeding propels the material out of nozzles of the conduit laterally, into the buckets. The covers have an inverted V-shape with a leading side thereof having a greater pitch than a trailing side. A bucket tilter "kicks" the buckets forwardly as the cover endless conveyor lifts covers away from the buckets. The upside-down bucket conveyor assembly includes a static surface which impinges on buckets to turn them right-side up, but catches the buckets as they turn to allow a controlled turn.

BRIEF DESCRIPTION OF THE DRAWINGS

The foregoing and other objects, features and advantages of the invention will be apparent from the following more particular description of the preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF PREFERRED EMBODIMENTS

Figure 1:
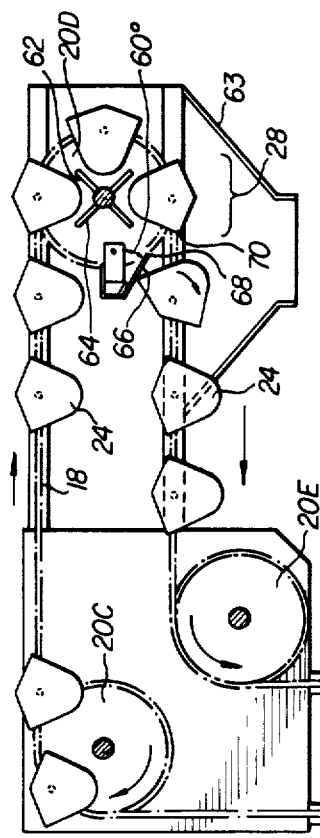
FIG. 1 is a cut-away side view of a bucket conveyor assembly employing principles of this invention.

Referring now to FIG. 1, a bucket conveyor assembly 10 comprises a frame 12 having a lower horizontal section 14', a vertical section 16, and an upper horizontal section 18. The frame 12 has dual, rotatable sprocket pairs 20A-F mounted thereon onto which two, side-by-side, endless chains 22 (only one can be seen in FIG. 1) are mounted. These chains have suspended therebetween buckets 24 for transporting goods therein from a loading zone 26 to an emptying zone 28. In this regard, the buckets 24 are attached to the dual chains 22 at pivot mounts 30' (shown in more detail in FIG. 2) which allow the buckets to pivot freely about the pivot axes 30. The buckets have relatively deep troughs 32 which tend to fall to a lower position, and thereby maintain the buckets in upright positions. It should be noted that the buckets can be rotated about the pivots 30 360° without contacting adjacent buckets, no matter what position adjacent buckets are in.

The sprockets 20A-F are located at ends and turns of the conveyor assembly 10 to guide the endless chains 22, and their attached buckets, about these turns. Bucket-pivot mounts 30' space the buckets inwardly from the chains 22 so that the buckets can pass between sprocket pairs 20A-F without contacting the sprockets.

Buckets that are used in the preferred embodiment of this invention include "DURA-BUKETS" sold by the Dura-Buket Division of National Oats Company, Inc., 1300 Lebanon Road, P.O. Box 448, Collinsville, Ill. 62234. These buckets are standard, off-the-shelf, plastic buckets which do not have special cams and the like attached thereto. The only attachment to these buckets are the pivot mounts 30' which attach the buckets to the chains 22. A primary feature of these buckets is that they are less expensive than specialized buckets required for most prior-art bucket conveyors, such as the buckets in U.S. Pat. No. 3,795,305 to Sandvik.

Looking in more detail at the loading zone 26, a cover endless conveyor 34 is mounted inside top and bottom flights 36A and B of a lower horizontal section 14 of the bucket conveyor. The cover endless conveyor 34 also includes dual endless chains 38 having covers 40 attached between them. The lower flights of both the cover endless conveyor 34 and the lower horizontal section 14 of the bucket conveyor 10 are traveling in the direction designated by arrow 42. Movement of these endless conveyors is synchronized such that the covers 40 span gaps 44 between the buckets 24 at the loading zone 26. In the preferred embodiment, the covers 40 are V-shaped (inverted V for the bottom flight of the cover endless conveyor 34), however, the V-shape is not symmetrical. A leading side 46 of each of the covers has a greater angle 50 with the horizontal than does the following side 48. In this respect, the angle 50 of the leading edge is about 50° for the preferred embodiment, however, this angle should not be less than 45°. On the other hand, the angle 52, in the preferred embodiment, is around 38°. In one respect it is desirable to have both these angles small so that the cover will cover a larger area, however, a greater angle will more easily allow material to tumble downwardly into the buckets. A factor which complicates matters is that material falling onto the leading side 46 has a component of force lifting it due to forward motion of the leading side, while material falling on the trailing side 48 falls more readily. A compromise between these factors is to make the leading side steeper, and the following side less steep, which is what is done in this invention.

Figure 2:
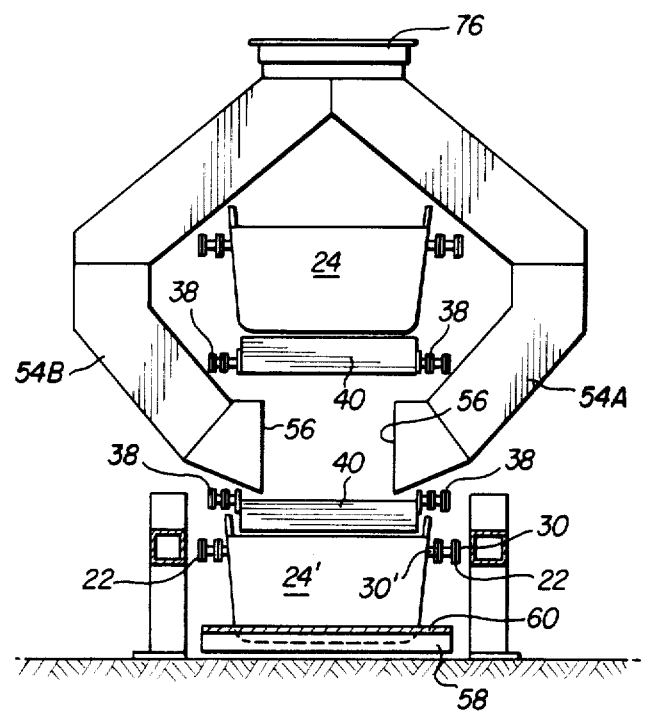
FIG. 2 is a sectional view taken on line 2—2 of FIG. 1.

Looking next at a material feeding mechanism for feeding material to be loaded into the buckets 24 between top and bottom flights of the cover endless conveyor 34 and the bucket conveyor assembly 10, a first embodiment of this loading assembly is depicted in FIG. 2. A bucket 24' at the loading zone 26 has dual chutes 54A and B directing material laterally across the top of the bucket 24', and into the bucket 24', by gravity. That is, each of the chutes 54A and B has a substantially vertical component immediately adjacent to a nozzle 56 such that material exiting from each of the nozzles 56 has a substantial amount of kinetic energy created by falling downwardly when it exits from the nozzle 56. The material is guided during its fall toward the nozzles 56 by the steep chutes 54A and B. In any event, the material has a substantially lateral component pushing the material across the top of the bucket 24' while the material is falling into the bucket 24'. By feeding the material from each of opposite sides, as is depicted in FIG. 2, the bucket 24' tends to be relatively uniformly filled across the bucket.

Although the steep leading sides 46 of the covers 40 improve the efficiency of the covers 40 by allowing material to fall into the buckets 24, when the covers 40 are lifted away from the buckets 24 at the end 56 of the cover endless conveyor 34, material sometimes tends to fall out of the back of the bucket. Part of the reason for this is that forward motion of the bucket tends to cause material loaded into the bucket to be piled higher toward the back of the bucket, and this material often gets piled as high as the leading side 46 of the cover 40. To compensate for this problem a tipping, or tilting, bar 58, and an attached ramp 60, are placed in the path of the bottom of the buckets 24 just prior to the covers 40 being lifted away from the buckets by the cover endless conveyor 34. The bar 58 kicks buckets 24 forwardly causing contents thereof to roll across the top of a load toward the front of the bucket. In addition, by rotating the buckets in a counterclockwise direction, as viewed in FIG. 1, the rear lip of the bucket is raised toward its rear cover 40 about the same time that the cover is lifted. These two actions virtually eliminate droppage of material between the leading side 46 of a cover and the rear edge of the bucket 24 as the covers are being lifted. The ramp 60 maintains the bucket in this tilted orientation over a short distance and then slowly allows the bucket to return to its original, free-rotation, mode. By letting the bucket return to its original orientation slowly, the position of material in the bucket is not substantially affected.

Describing now the mechanism at the emptying zone 28, the emptying mechanism includes a paddle wheel 62 having sections which are synchronized to receive the bottoms of buckets 24. The paddle wheel 62 turns synchronously with sprocket dual pairs 20D so that when a bucket 24 is rotated about the sprocket pair 20D, the buckets are not allowed to hang free and seek their own orientation, but rather they are turned upside down. Once the buckets have emptied their contents into a funnel 64 and their bottoms are released by the paddle wheel 62, it is desirable to rotate the buckets to an upright position. However, the buckets should not be allowed to rotate by themselves, because such action will put too much stress on the various components, including the buckets. However, it is also desirable to have a simple mechanism for uprighting the buckets. Such a mechanism is provided by a straight slab 66 attached to the frame 12 at an angle of 60° in the path of the bottom of an upside down bucket as is depicted in FIG. 1. An outer tip 68 of the slab 66 impinges on the bottom of the bucket as the bucket is conveyed by the endless chains 22 and urges the bucket toward a clockwise rotation. However, as the bucket turns in this clockwise direction the outer surface of its side 70 comes in contact with a surface of the slab 66 thereby preventing a sudden rotation of the bucket 24 (see FIG. 4). As the bucket is conveyed in the direction of the arrow 72 the slab 66 allows the bucket to rotate more and more until finally it is released from the slab 66 and completes its rotation to an upright position. The angle of the slab 66 is determined by the shape of the bucket, however, it is thought that this angle must be between 45° and 75°.

Figure 3:
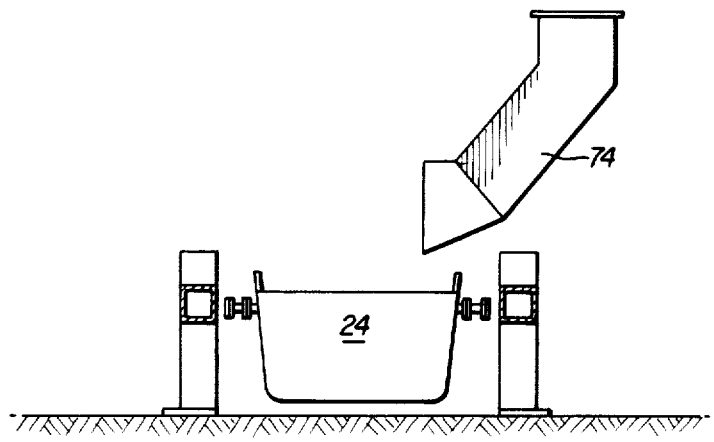
FIG. 3 is a sectional view taken on a line corresponding to line 2—2 of FIG. 1, but of a modified embodiment.

A second embodiment of the invention is depicted in FIG. 3 which depicts a bucket 24 at a loading zone of a bucket conveyor of this invention being fed with a chute 74 from only one side. In this regard, 11 inch buckets can be loaded from one side and it presently appears that buckets as wide as 16 inches can be conveniently loaded from both sides. An advantage of a one-sided loader over a two-sided loader is that with a one-sided loader a smaller vertical clearance is required immediately over the loading zone.

In operation, materials to be loaded into buckets 24 of the bucket conveyor assembly 10 is fed from a main chute 76 into subsidiary chutes 54A and B. These chutes allow the materials to fall downwardly under the force of gravity and guide the materials to be expelled, under the force of gravity from the nozzles 56. These materials fall from the nozzles laterally, and downwardly, toward the buckets 24. Much of this material falls directly into the buckets 24. However, the material is continuously fed from the nozzles 56 and as the buckets 24 are conveyed under the nozzles 56, much of the material falls on the covers 40. These covers guide material falling on them into the buckets 24. The greater angle of the leading sides 46 of the covers 40 is sufficient to more easily overcome a lifting component of force caused by forward motion and thereby allow faster overall operation. Material tends to build up toward the backs of the buckets, and the leading sides 46 of the covers, because of fast forward motion of the buckets; however, when the buckets 24 impinge on the tipping bar 58, they are caused to "kick up" in a counterclockwise direction, thereby throwing material away from the front sides of the covers 46 and the backs of the buckets prior to the covers 40 being lifted from the buckets. Also because of this tilting as the covers are lifted away, the backs of the buckets are raised thereby preventing any material which is lifted by the leading sides 46 of the covers from falling between the leading sides 46 and the back lips of the buckets. The ramp 60 allows the buckets to come again to upright positions gradually.

Figure 4:
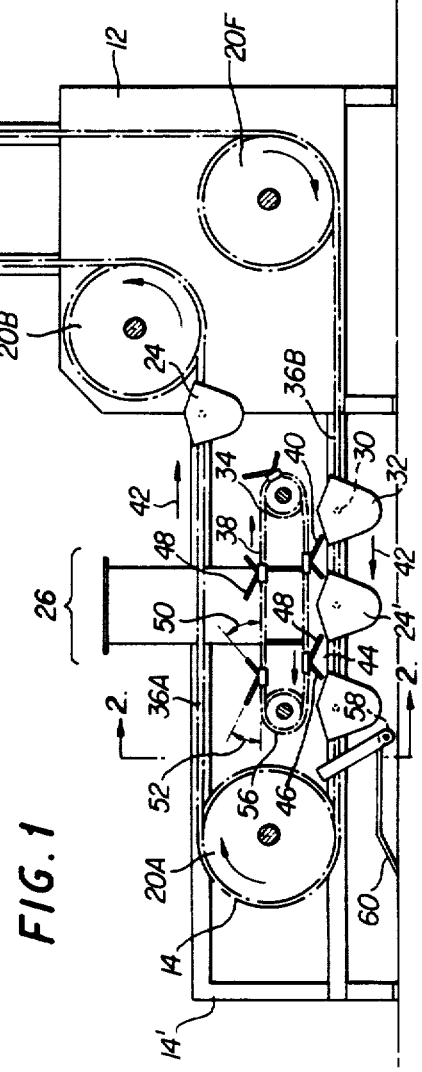
FIG. 4 is a side view depicting a small portion of the apparatus of FIG. 1 at an instant in a cycle of operation.

The fully loaded buckets are conveyed about the dual sprockets 20A, 20B, and 20C toward the emptying zone 28. As the buckets go around these sprockets, they remain in upright positions because they are free to rotate and gravity holds them in these upright positions. However, when these buckets begin to go around the dual sprockets 20D, their bottoms are held from freely rotating by the paddle wheel 62. Thus, when the buckets reach the bottom of the dual sprockets 20D, they are in upside-down positions and their contents are dumped into the funnel 64. Upon the bottoms of the buckets being released from the paddle wheel 62, they are impinged on by the outer tip 68 of the slab 66, thereby giving a clockwise, as viewed in FIG. 1, rotational impulse. However, the buckets are immediately further impinged on by the lower surface 66' of the slab 66, as is depicted in FIG. 4, and are controlled to rotate toward upright positions gradually until released by the slab 66. These empty buckets then return to the loading zone 26 to receive new loads.

It will be understood by those familiar with this art that buckets used for most prior-art continuous-loading bucket conveyors are comparatively quite a bit more expensive than buckets for the bucket conveyor of this invention. By way of example, buckets for Sandvik (3,795,305) are specialized buckets having specialized lips and also including specialized control wheels. Similarly, the buckets of Saxon (4,221,764) have unusual shapes and require control wheels to control their orientations.

It should be further appreciated that with applicant's invention a cheaper type of conveyor chain can be used because tolerances are not so critical as with overlapping buckets. Further, because in applicant's invention the buckets can be rotated at any point of travel 360°, one can "dump" a bucket load away from a turn.

The invention described herein is also more efficient than an overlapping bucket system in which much energy is used up by friction. In addition, it is far less likely that the conveyor of this invention will get jammed than overlapping bucket systems.

The conveyor of this invention also handles the materials being conveyed gently so that the materials are not damaged. For example, when peanuts are handled it is desirous that the peanuts not be "split", and this conveyor normally does not split the peanuts.

While the invention has been particularly shown and described with reference to a preferred embodiment, it will be understood by those skilled in the art that various changes in form and detail may be made therein without departing from the spirit and scope of the invention.

The embodiments of the invention in which an exclusive property or privilege is claimed are defined as follows:

1. A bucket conveyor assembly comprising:

a bucket endless conveyor including an endless flexible means for carrying longitudinally-spaced buckets attached thereto in a closed path, said closed path being defined by pulley means located at corners of said closed path for engaging and guiding said endless flexible means, said main bucket endless conveyor including a substantially horizontal section having an upper flight traveling in a first direction and a vertically-spaced lower flight traveling in an opposite direction;

a cover endless conveyor comprising an endless flexible means for carrying longitudinally-spaced covers attached thereto in a closed path, said covers being of a sufficient size to span longitudinal spaces between said buckets, said cover endless conveyor being located inside said horizontal section of said bucket endless conveyor, between said upper and lower flights, and being positioned parallel to said lower flight;

driving means for driving said bucket endless conveyor and said cover endless conveyor in the same direction and at such speeds that said covers of a lower stretch of said cover endless conveyor are superimposed with spaces between said buckets on said lower flight of said bucket endless conveyor at a loading zone;

a bucket-loading means for gravity-feeding goods to be loaded between upper and lower flights of both said bucket endless conveyor and said cover endless conveyor into buckets on said lower flight of said bucket endless conveyor at said loading zone; and a bucket tilter downstream of said loading zone, but before said cover is lifted away from said space between said loaded buckets, for suddenly tilting said buckets forwardly.

2. A bucket conveyor assembly as in claim 1 wherein said covers have an inverted V-shape when they are covering spaces between said buckets at said loading zone, and wherein a leading side of said V has a steeper angle than a trailing side of said V.

3. A bucket conveyor assembly as in claim 1 wherein said bucket tilter means includes a stationary bar for coming into contact with a bottom portion of said bucket during the travel of said bucket, and a following ramp downstream of said bar for relatively gently allowing said buckets to counter-rotate to upright positions.

4. A bucket conveyor assembly as in claim 1 wherein said bucket-loading means includes a dual means for loading each of said buckets from opposite sides thereof.

5. A bucket conveyor assembly as in claim 1 wherein said bucket-loading means includes a dual means for loading each of said buckets from opposite sides thereof.

6. A bucket conveyor assembly comprising:

a bucket endless conveyor including an endless flexible means for carrying longitudinally-spaced buckets attached thereto in a closed path, said closed path being defined by pulley means located at corners of said closed path for engaging and guiding said endless flexible means, said bucket endless conveyor including a portion having a horizontal component;

a cover endless conveyor comprising an endless flexible means for carrying longitudinally spaced covers attached thereto in a closed path, said covers being of a sufficient size to span longitudinal spaces between said buckets, and being positioned parallel to a flight of said bucket endless conveyor at a loading zone;

driving means for driving said bucket endless conveyor and said cover endless conveyor in the same direction and at such speeds that said covers of a lower flight of said cover endless conveyor are superimposed with spaces between said buckets at said loading zones;

a bucket-loading means for feeding materials to be loaded between upper and lower flights of said cover endless conveyor to buckets on said bucket endless conveyor at said loading zones; and a bucket-tipping means for suddenly tipping said loaded buckets forwardly subsequent to said buckets receiving a load, but prior to said covers being fully lifted from said spaces between said buckets.

7. A bucket conveyor assembly as in claim 6 wherein said bucket tipping means includes a stationary bar located in the path of the bottoms of said buckets and a following ramp to contact said buckets and thereby allow them to gently go back to upright positions.

* * * * *